US008009338B2

(12) United States Patent
Dokuni

(10) Patent No.: US 8,009,338 B2
(45) Date of Patent: Aug. 30, 2011

(54) IMAGE PROCESSING APPARATUS

(75) Inventor: Kenji Dokuni, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 820 days.

(21) Appl. No.: 12/052,612

(22) Filed: Mar. 20, 2008

(65) Prior Publication Data
US 2008/0231921 A1 Sep. 25, 2008

(30) Foreign Application Priority Data

Mar. 22, 2007 (JP) ................................ 2007-074775

(51) Int. Cl.
G03F 3/08 (2006.01)
H04N 1/60 (2006.01)
G06K 9/00 (2006.01)
(52) U.S. Cl. .......... 358/520; 358/518; 358/1.9; 382/167
(58) Field of Classification Search .................. 358/520, 358/1.9, 518, 523, 530, 501, 502, 504, 1.13, 358/1.16, 1.1; 382/163, 167, 224
See application file for complete search history.

(56) References Cited

U.S. PATENT DOCUMENTS

| 4,954,881 | A * | 9/1990 | Kaye .............................. 348/577 |
| 5,335,292 | A * | 8/1994 | Lovelady et al. ............... 382/163 |
| 5,742,520 | A | 4/1998 | Uchikawa et al. |
| 5,812,178 | A * | 9/1998 | Yamaguchi ..................... 347/251 |
| 6,025,862 | A | 2/2000 | Thompson |
| 6,631,206 | B1 * | 10/2003 | Cheng et al. ................... 382/164 |
| 6,791,716 | B1 * | 9/2004 | Buhr et al. ...................... 358/1.9 |
| 7,016,075 | B1 * | 3/2006 | Tsukada ......................... 358/1.9 |
| 7,110,595 | B2 | 9/2006 | Inoue |
| 7,474,446 | B2 * | 1/2009 | Horiuchi et al. ............... 358/520 |
| 7,502,033 | B1 * | 3/2009 | Axelrod ......................... 345/593 |
| 7,821,546 | B2 * | 10/2010 | Sakamoto et al. .......... 348/222.1 |
| 2003/0002095 | A1 * | 1/2003 | Gruzdev et al. ............... 358/518 |
| 2003/0012433 | A1 * | 1/2003 | Gruzdev et al. ............... 382/167 |
| 2003/0072015 | A1 * | 4/2003 | Fujino ............................ 358/1.9 |

(Continued)

FOREIGN PATENT DOCUMENTS

EP 1318478 A2 6/2003

(Continued)

OTHER PUBLICATIONS

Japanese language office action and its English language translation for corresponding Japanese application 2007074775 lists the references above.

(Continued)

*Primary Examiner* — Madelein A Nguyen
(74) *Attorney, Agent, or Firm* — DLA Piper LLP (US)

(57) ABSTRACT

An image processing apparatus that reduces a color of a document image to be printed. An image generation unit scans a document to generate image data. A hue determination unit determines a specific hue included in the image data and a hue becoming a complementary color of the specific hue. A color reduction unit reduces a color of the image data based on the specific hue and the hue becoming the complementary color of the specific hue. An output unit outputs the image data whose color is reduced on a recording medium. Image data that is of a hue in a predetermined range from the hue becoming the complementary color is replaced with the hue becoming the complementary color, and image data that is outside of the predetermined range is replaced with the specific hue.

18 Claims, 10 Drawing Sheets

U.S. PATENT DOCUMENTS

| | | | |
|---|---|---|---|
| 2003/0128379 A1 | 7/2003 | Inoue | |
| 2003/0176281 A1 | 9/2003 | Hultgreen | |
| 2004/0234126 A1* | 11/2004 | Hampshire et al. | 382/162 |
| 2004/0263456 A1* | 12/2004 | Miyachi et al. | 345/88 |
| 2005/0040774 A1* | 2/2005 | Mueller et al. | 315/291 |
| 2005/0057765 A1* | 3/2005 | Fujita et al. | 358/1.9 |
| 2006/0028577 A1* | 2/2006 | Honjo et al. | 348/345 |
| 2006/0061842 A1* | 3/2006 | Oka et al. | 358/522 |
| 2006/0072814 A1* | 4/2006 | Messina et al. | 382/162 |
| 2006/0082844 A1* | 4/2006 | White | 358/504 |
| 2007/0052813 A1* | 3/2007 | Neter | 348/222.1 |
| 2007/0115665 A1* | 5/2007 | Mueller et al. | 362/276 |
| 2007/0177171 A1* | 8/2007 | Szilagyi et al. | 358/1.9 |
| 2007/0236761 A1* | 10/2007 | Sloan | 358/520 |
| 2007/0279534 A1* | 12/2007 | Doser | 348/743 |
| 2008/0007806 A1* | 1/2008 | Shirasawa | 358/520 |
| 2008/0285860 A1* | 11/2008 | Datta et al. | 382/224 |
| 2008/0310870 A1* | 12/2008 | Berg et al. | 399/54 |
| 2010/0103207 A1* | 4/2010 | Kushner et al. | 347/5 |

FOREIGN PATENT DOCUMENTS

| | | |
|---|---|---|
| JP | 02007091 A | 1/1990 |
| JP | 06-152995 | 5/1994 |
| JP | 08123958 A | 5/1996 |
| JP | 2000-013621 | 1/2000 |
| JP | 2004-007370 | 1/2004 |
| WO | 03079668 A1 | 9/2003 |

OTHER PUBLICATIONS

European Search Report for corresponding European application 08003406.9-2202 lists the references above.

Chinese language office action dated Dec. 12, 2010 and its English language translation for corresponding Chinese application 200810085174.7.

* cited by examiner

COLOR-DIFFERENCE
SYSTEM

YELLOW

GREEN — RED

BLUE

HUE-CHROMA
SATURATION SYSTEM

HUE-CHROMA
SATURATION SYSTEM

HUE-CHROMA
SATURATION SYSTEM

FIG. 9

| INPUT | | | OUTPUT | | | |
|---|---|---|---|---|---|---|
| LIGHTNESS | HUE | CHROMA SATURATION | C | M | Y | K |
| 0 | 0 | 0 | 0 | 0 | 0 | 100 |
| ⋮ | ⋮ | ⋮ | ⋮ | ⋮ | ⋮ | ⋮ |
| 50 | 0 | 0 | 0 | 0 | 0 | 50 |
| 50 | 0 | 10 | 0 | 10 | 5 | 10 |
| 50 | 0 | 20 | 0 | 20 | 10 | 0 |
| ⋮ | ⋮ | ⋮ | ⋮ | ⋮ | ⋮ | ⋮ |
| 60 | 0 | 0 | 0 | 0 | 0 | 40 |
| 60 | 0 | 10 | 0 | 12 | 6 | 5 |
| 60 | 0 | 20 | 0 | 24 | 12 | 0 |
| ⋮ | ⋮ | ⋮ | ⋮ | ⋮ | ⋮ | ⋮ |
| 100 | 360 | 100 | 0 | 0 | 0 | 0 | ial
IMAGE PROCESSING APPARATUS

CROSS-REFERENCE TO RELATED APPLICATIONS

This application claims priority under 35 U.S.C. 119 to Japanese Patent Application No. 2007-074775, filed on Mar. 22, 2007, which application is hereby incorporated by reference in its entirety.

BACKGROUND OF THE INVENTION

1. Field of the Invention

The present invention relates to an image processing apparatus, particularly to an image processing apparatus that outputs a document image while reducing a color of the document image.

2. Description of the Related Art

Conventionally, for example, Japanese Patent Publication Laid-Open No. 2004-7370 discloses an image processing apparatus having a function of reducing the color of the document. The image processing apparatus of Japanese Patent Publication Laid-Open No. 2004-7370 is a personal computer, in which the color of the document scanned with a scanner is reduced and the color-reduced document image is printed on recording paper with a printer. A hue to be retained is specified by clicking a document image displayed on a monitor, and pixels except for the specified color are converted into a monochrome color to achieve the color reduction. In addition, a hue included in a predetermined range can be retained, and hue outside of the range can be converted into a monochrome color.

Thus, according to this related art, only a specified or predetermined range of hue is retained. Therefore, there is a problem in that when color reduction is performed to a document image having a broad hue distribution, the color-reduced image has low hue contrast.

BRIEF SUMMARY OF THE INVENTION

In order to overcome the problems described above, the present invention provides an image processing apparatus that obtains a color-reduced image having high hue contrast.

One embodiment of the present invention provides an image processing apparatus that outputs a document image while reducing a color of the document image. An image generation unit scans a document to generate image data. A hue determination unit determines a specific hue included in the image data and a hue becoming a complementary color of the specific hue. A color reduction unit retains the specific hue and the hue becoming the complementary color to reduce a color of the image data. An output unit outputs the image data whose color is reduced by the color reduction unit.

Therefore, in this image processing apparatus, the image generation unit scans the document to generate the image data. Then, the hue determination unit determines the specific hue included in the image data and the hue becoming the complementary color of the specific hue. The color reduction unit retains the specific hue and the hue becoming the complementary color to then reduce a color of the image data. The output unit outputs the image data whose color is reduced by the color reduction unit. For example, the output unit prints the color-reduction image data on recording paper or outputs the color-reduction image data as a file. Thus, the specific hue and the hue becoming the complementary color of the specific hue are retained before color reduction of the image data, so that a color-reduced image having high hue contrast is obtained.

In one embodiment, the color reduction unit replaces image data that is of a hue in a predetermined range from the hue becoming the complementary color with the hue becoming the complementary color, and replaces image data that is of a hue outside of the predetermined range with the specific hue. Accordingly, a color-reduction image is obtained in which pixels which are of a hue in a predetermined range from the hue becoming the complementary color are set to the hue becoming the complementary color while pixels that are of a hue outside of the predetermined range are set to the specific hue.

In one embodiment, the color reduction unit replaces image data that is of a hue in a predetermined first range from the specific hue with the specific hue, the color reduction unit replaces image data that is of a hue in a predetermined second range from the hue becoming the complementary color with the hue becoming the complementary color, and chroma saturation of image data that is of a hue outside of the predetermined first and second ranges is set to be zero.

Therefore, the color reduction unit replaces image data which is of a hue in a predetermined first range from the specific hue with the specific hue and replaces image data which is of a hue in a predetermined second range from the hue becoming the complementary color with the hue becoming the complementary color. The chroma saturation of image data which is of a hue outside of the predetermined first and second ranges is set to be zero. Accordingly, a color-reduction image is obtained in which pixels that are of the hue in the predetermined first range from the specific hue are set to be the specific hue, pixels that are of the hue in the predetermined second range from the hue becoming the complementary color are set to be the hue becoming the complementary color, and the chroma saturation of pixels that are of the hue outside of the first and second ranges is set to be zero. According to this color reduction method, the portion having the hue is decreased compared with the monochrome portion. Thus, the portion having the hue, which is of the point of the document, is emphasized and consumption of color material such as toner is reduced.

In one embodiment, the hue determination unit sets a hue having the highest chroma saturation of hues included in the image data to the specific hue.

Therefore, a color-reduction image is obtained in which the hue having the highest chroma saturation and the hue becoming the complementary color are retained. Because the portion that becomes the point in the document image is frequently recorded in bright color, the color of the important portion is left by retaining the hue having the highest chroma saturation and the hue becoming the complementary color. Such color reduction processing is suitable to a document having few colors and a relatively small area of the colored portion compared to the whole document area.

In another embodiment, the color reduction unit retains before color reduction of the image data the specific hue and the hue becoming the complementary color when chroma saturation of the hue becoming the complementary color is not lower than a predetermined threshold value, and retains before color-reduction the specific hue when the chroma saturation of the hue becoming the complementary color is lower than the predetermined threshold value.

Therefore, the hue becoming the complementary color is retained only when high hue contrast can be obtained by retaining the hue becoming the complementary color when the chroma saturation of the hue becoming the complementary color is not lower than the predetermined threshold value. When the chroma saturation of the hue becoming the complementary color is lower than the predetermined threshold value, the high hue contrast cannot be maintained. In such case, because the hue becoming the complementary color is not retained, the toner is saved.

In another embodiment, the color reduction unit retains before color reduction of the image data the specific hue and the hue becoming the complementary color when a proportion of chroma saturation of the hue becoming the complementary color to chroma saturation of the specific hue is not lower than a predetermined value, and retains before color reduction the specific hue when the proportion is lower than the predetermined value.

Therefore, when the proportion of chroma saturation of the hue becoming the complementary color to chroma saturation of the specific hue is not lower than the predetermined value, high hue contrast can be obtained. Only in such cases is the hue becoming the complementary color retained. When the proportion of chroma saturation of the hue becoming the complementary color to chroma saturation of the specific hue is lower than the predetermined value, high hue contrast cannot be maintained. In such case, because the hue becoming the complementary color is not retained, the toner is saved.

In another embodiment, the hue determination unit sets a hue having the highest appearance frequency of hues included in the image data to be the specific hue.

Therefore, a color-reduction image in which the hue having the highest appearance frequency and the hue becoming the complementary color are retained is obtained. In the case of a document in which many colors are provided, an area of the colored portion to the whole document area is relatively large, and the whole impression is determined by a color having a large proportion to the colored portion. Thus, color reduction can be performed without losing quality of the whole image a lot by retaining the hue having the highest appearance frequency and the hue becoming the complementary color.

In another embodiment, the color reduction unit retains before color reduction of the image data the specific hue and the hue becoming the complementary color when appearance frequency of the hue becoming the complementary color is not lower than a predetermined threshold value, and the color reduction unit retains before color reduction the specific hue when the appearance frequency of the hue becoming the complementary color is lower than the predetermined threshold value.

Therefore, when the appearance frequency in the image data of the hue becoming the complementary color is not lower than the predetermined threshold value, high hue contrast can be obtained. Only in such cases is the hue becoming the complementary color retained. When the appearance frequency in the image data of the hue becoming the complementary color is lower than the predetermined threshold value, high hue contrast cannot be maintained. In such cases, because the hue becoming the complementary color is not retained, the toner is saved.

In another embodiment, the color reduction unit retains before color reduction of the image data the specific hue and the hue becoming the complementary color when a proportion of appearance frequency of the hue becoming the complementary color to appearance frequency of the specific hue is not lower than a predetermined value, and the color reduction unit retains before color reduction the specific hue when the proportion is lower than the predetermined value.

Therefore, when the proportion of the appearance frequency of the hue becoming the complementary color to the appearance frequency of the specific hue is not lower than the predetermined value, high hue contrast can be obtained. Only in such cases is the hue becoming the complementary color retained. When the proportion of the appearance frequency of the hue becoming the complementary color to the appearance frequency of the specific hue is lower than the predetermined value, high hue contrast cannot be maintained. In such cases, because the hue becoming the complementary color is not retained, the toner is saved.

Another embodiment of the invention further includes an input accepting unit that accepts an input operation from the outside. The hue determination unit determines the specific hue based on the accepted input operation, and the hue determination unit determines the hue becoming the complementary color based on the determined specific hue.

Therefore, the input accepting unit accepts an input operation performed to set a hue desired by the user to be the specific hue, thereby obtaining a color-reduced image in which the hue desired by the user is set to the specific hue, and the specific hue and the hue becoming the complementary color determined based on the specific hue are retained.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 9 is an example of a three-dimensional lookup table.

DETAILED DESCRIPTION OF EMBODIMENTS OF THE INVENTION

An internet facsimile apparatus 1 which is of an example of an image processing apparatus according to the invention is described below with reference to the drawings. The internet facsimile apparatus 1 is a so-called multi function peripheral (MFP) including facsimile, internet facsimile, electronic mail, scanning, copy, print and telephone functions. The internet facsimile apparatus 1 is installed in an office, for example, and connected to a public switched telephone network (PSTN) and a local area network (LAN).

Figure 1:
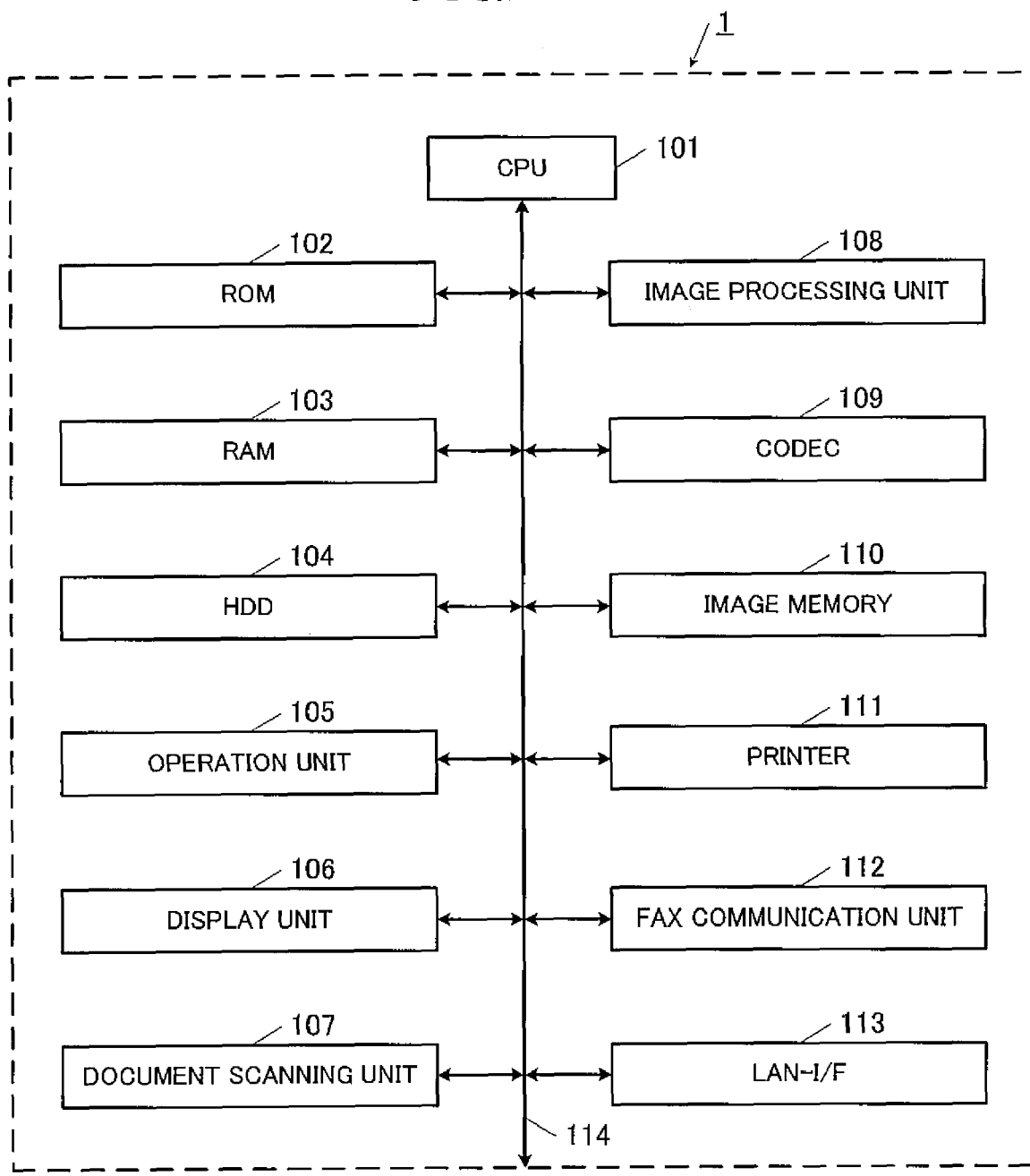
FIG. 1 is a block diagram of an internet facsimile apparatus according to the invention.

Referring to FIG. 1, which is a block diagram of the internet facsimile apparatus 1, the internet facsimile apparatus 1 includes a central processing unit (CPU) 101, a read only memory (RAM) 102, a random access memory (RAM) 103, a hard disk drive (HDD) 104, a operation unit 105, a display unit 106, a document scanning unit 107, an image processing unit 108, a Coder/Decoder (CODEC) 109, an image memory 110, a printer 111, a FAX communication unit 112 and a local area network interface (LAN-I/F) 113. The units 101-113 are connected and communicate through a bus 114.

CPU 101 controls operation of the units of the internet facsimile apparatus 1 according to a control program stored in ROM 102. Various kinds of data such as setting information used for the operation of the internet facsimile apparatus 1 are stored in RAM 103 in readable and writable manners. RAM 103 also functions as a work area of CPU 101. Image data transmitted and received by the facsimile function is accumulated in HDD 104.

The operation unit 105 includes a start key or the like for providing an instruction to start a document scanning operation, numeric keys for inputting a facsimile number, a number of copies and the like, character input keys for inputting characters, and cursor keys for specifying a operation target. The display unit 106 includes a touch-panel liquid crystal display (LCD) (operation panel) that displays various setting and operation states of the apparatus 1 with characters or graphics, and a light emitting diode (LED) lamp that expresses a state of the apparatus 1 by lighting or by going dark. The display of the LCD is changed according to key operations in the operation unit 105 or touch-panel touches in the display unit 106. Various kinds of input can be performed by operation of keys on the operation unit 105 or touches on the panel of the LCD.

The document scanning unit 107 scans a document image to generate image data of an RGB calorimetric system. The document scanning unit 107 includes a flat bed scanner (FBS) that scans a document placed on a transparent document placing plate and an automatic document feeder (ADF) that feeds documents to be scanned placed on a document tray.

The image processing unit 108 performs processing such as color adjustment and color reduction processing on image data outputted from the document scanning unit 107. The detailed color reduction processing is described later. The CODEC 109 encodes image data processed by the image processing unit 108 and decodes encoded image data. Image data inputted to the CODEC 109 is encoded based on JPEG, MH, MR, MMR, or JBIG methods and the like. Encoded image data is stored in the image memory 110.

The printer 111 prints image data of a CMYK calorimetric system that is read from the image memory 110 and decoded by the CODEC 109.

The FAX communication unit 112 conducts facsimile (FAX) communication of document image data. The FAX communication unit 112 includes a modulator/demodulator (MODEM) and a network control unit (NCU). The MODEM modulates and demodulates transmission and reception data pursuant to recommendation V.34 standard of ITU-T (International Telecommunication Union Telecommunication Standardization Sector) or similar standards. NCU is a line network control apparatus connected to the PSTN that controls a telephone line to place or disconnect a call. In addition to the internet facsimile apparatus 1, a G3 facsimile apparatus and the like can be connected to PSTN. The internet facsimile apparatus 1 can transmit and receive image data to and from a G3 facsimile apparatus through facsimile communication.

The LAN-I/F 113 enables the internet facsimile apparatus 1 to connect to the LAN. A client PC and the like are connected to the LAN, and the internet facsimile apparatus 1 can conduct data communication with the client PC. The internet facsimile apparatus 1 may be connected to and conduct internet facsimile communication with another internet facsimile apparatus through the LAN and a router. As used herein, internet facsimile communication means communication in which electronic mail to which TIFF (Tagged Image File Format)-S format file (image data) is attached is transmitted and received by SMTP (Simple Mail Transfer Protocol).

In the internet facsimile apparatus 1, a document image scanned with the document scanning unit 107 can be color-reduced and printed with the printer 111. In performing color reduction, a specific hue and a hue that becomes a complementary color of the specific hue are determined based on document image data generated by the document scanning unit 107, and the determined specific hue and the complementary-color hue are stored to perform color reduction. Color reduction processing is performed by dedicated circuits constituting the units 108a-108f of the image processing unit 108 of FIG. 2.

First Embodiment

Figure 2:
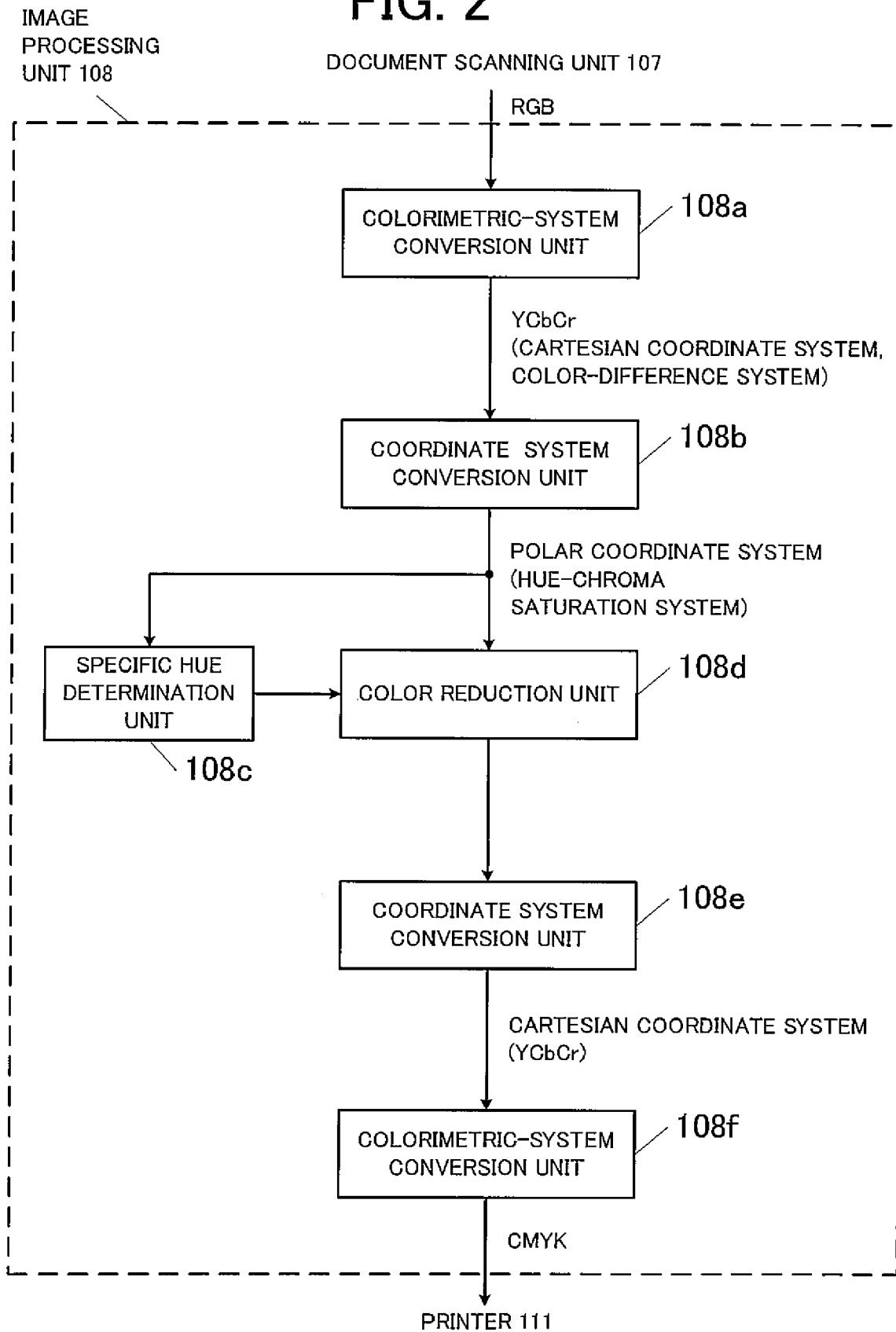
FIG. 2 is a block diagram of an image processing unit according to the invention.

Color reduction processing in the image processing unit 108 according to a first embodiment of the invention is described with reference to FIG. 2. Image data of the RGB calorimetric system, generated by the document scanning unit 107, is inputted to the image processing unit 108 and given to a colorimetric-system conversion unit 108a. The colorimetric-system conversion unit 108a converts image data of the RGB calorimetric system into image data of a YCbCr colorimetric system. As is known, the conversion of RGB calorimetric system data into YCbCr calorimetric system data is computed using the following equations (1)-(3).

$$Y = 0.299R + 0.587G + 0.114B \quad (1)$$

$$Cb = -0.169R - 0.331G + 0.500B \quad (2)$$

$$Cr = 0.500R - 0.419G - 0.081B \quad (3)$$

Figure 3:
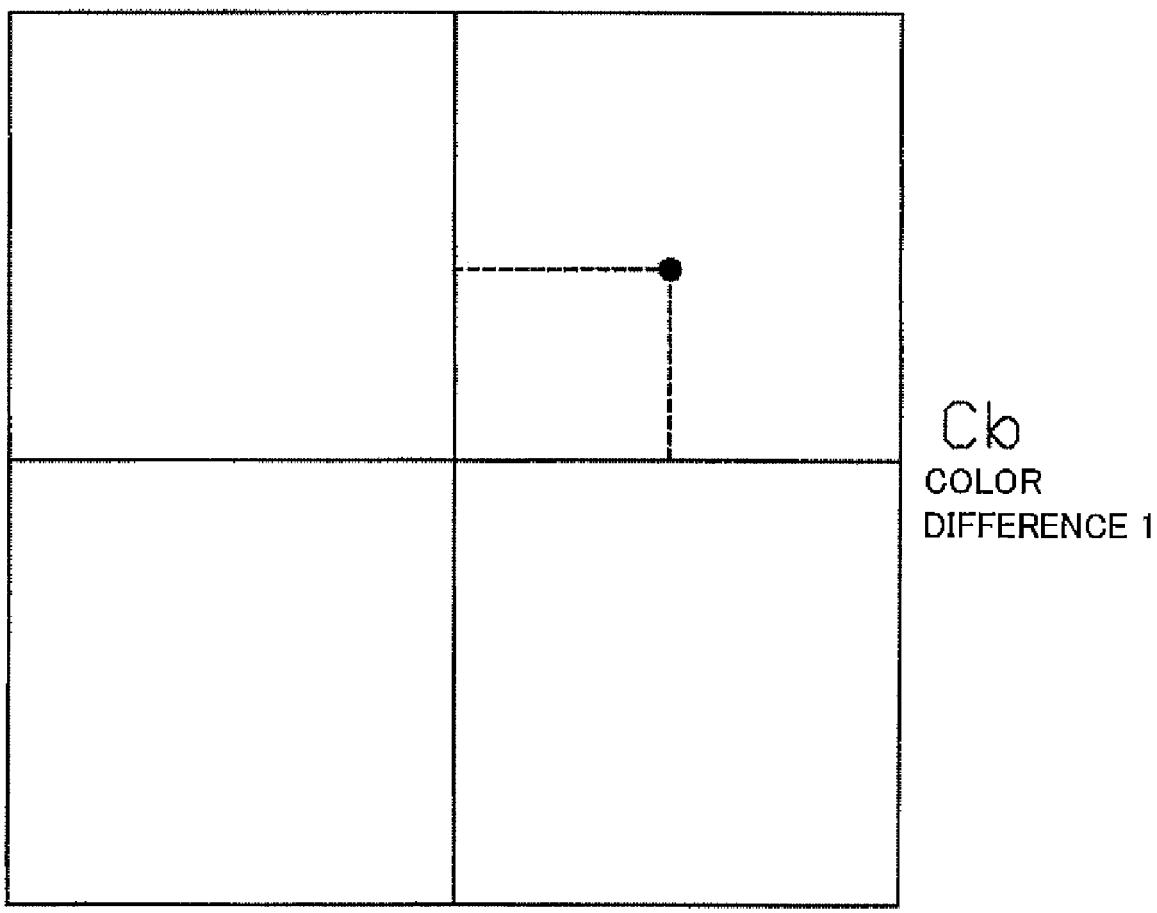
FIG. 3 is a diagram illustrating a Cartesian coordinate of a YCbCr calorimetric (color-difference) system.
Figure 4:
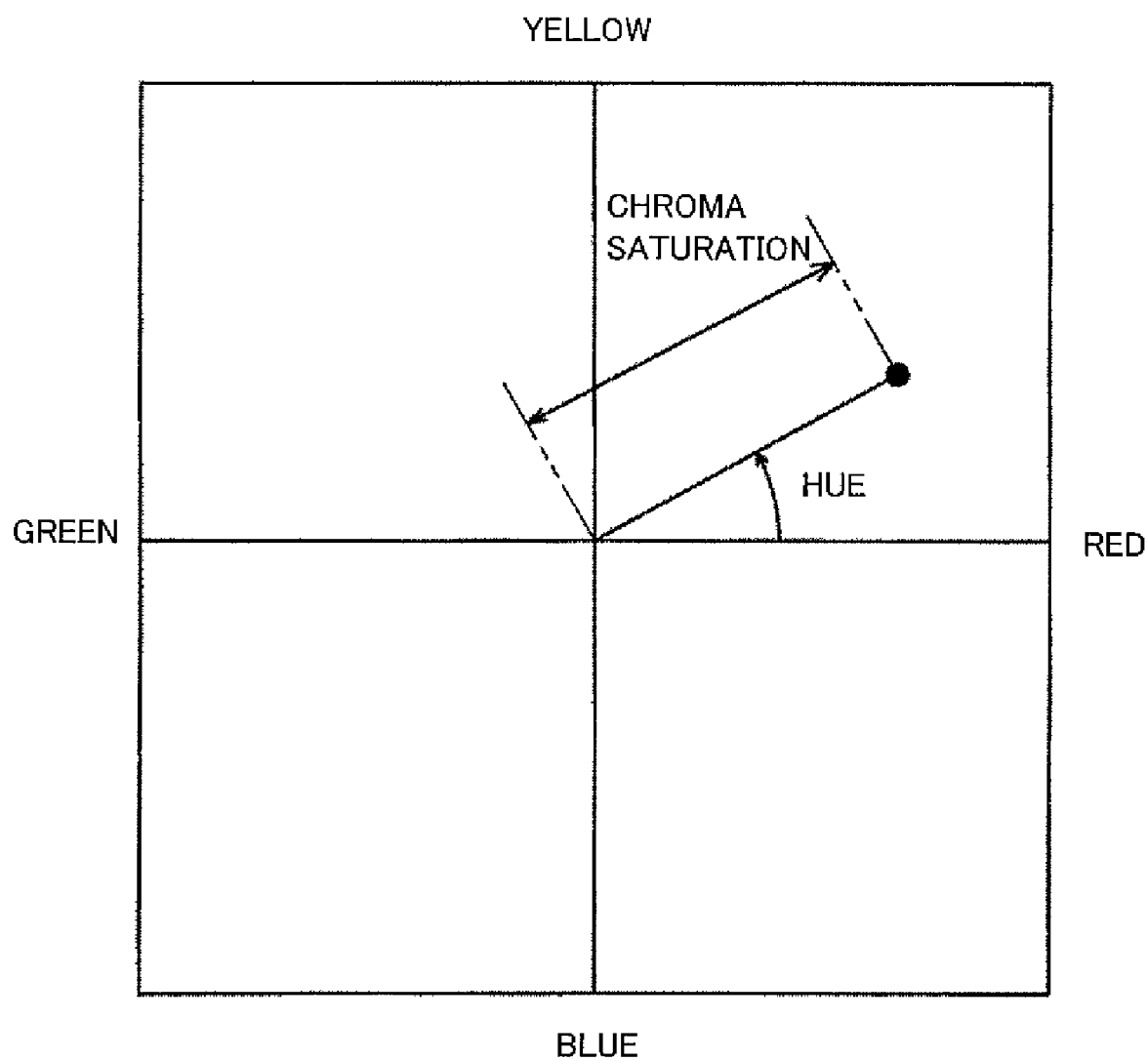
FIG. 4 is a diagram illustrating a polar coordinate of a hue-chroma saturation system.

The YCbCr calorimetric system is a color-difference system and is also a Cartesian coordinate system (FIG. 3) in which an axis perpendicular to the paper plane indicates brightness (Y), a horizontal axis indicates a color difference 1 (Cb), and a vertical axis indicates a color difference 2 (Cr). Image data of the YCbCr calorimetric system does not include a hue parameter. Therefore, in order to determine a retained hue, the output of the colorimetric-system conversion unit 108a is provided to a coordinate-system conversion unit 108b to convert the Cartesian coordinate system into a polar coordinate system (polar coordinate conversion), and image data of the YCbCr calorimetric system is converted into image data including the hue parameter. As illustrated in FIG. 4, the coordinate-system conversion unit 108b converts image data of the color-difference system into image data of a hue-chroma saturation system. An axis perpendicular to the paper plane of FIG. 4 indicates lightness. The conversion of the Cartesian coordinate system into the polar coordinate system is performed by well-known computation processing.

Figure 5:
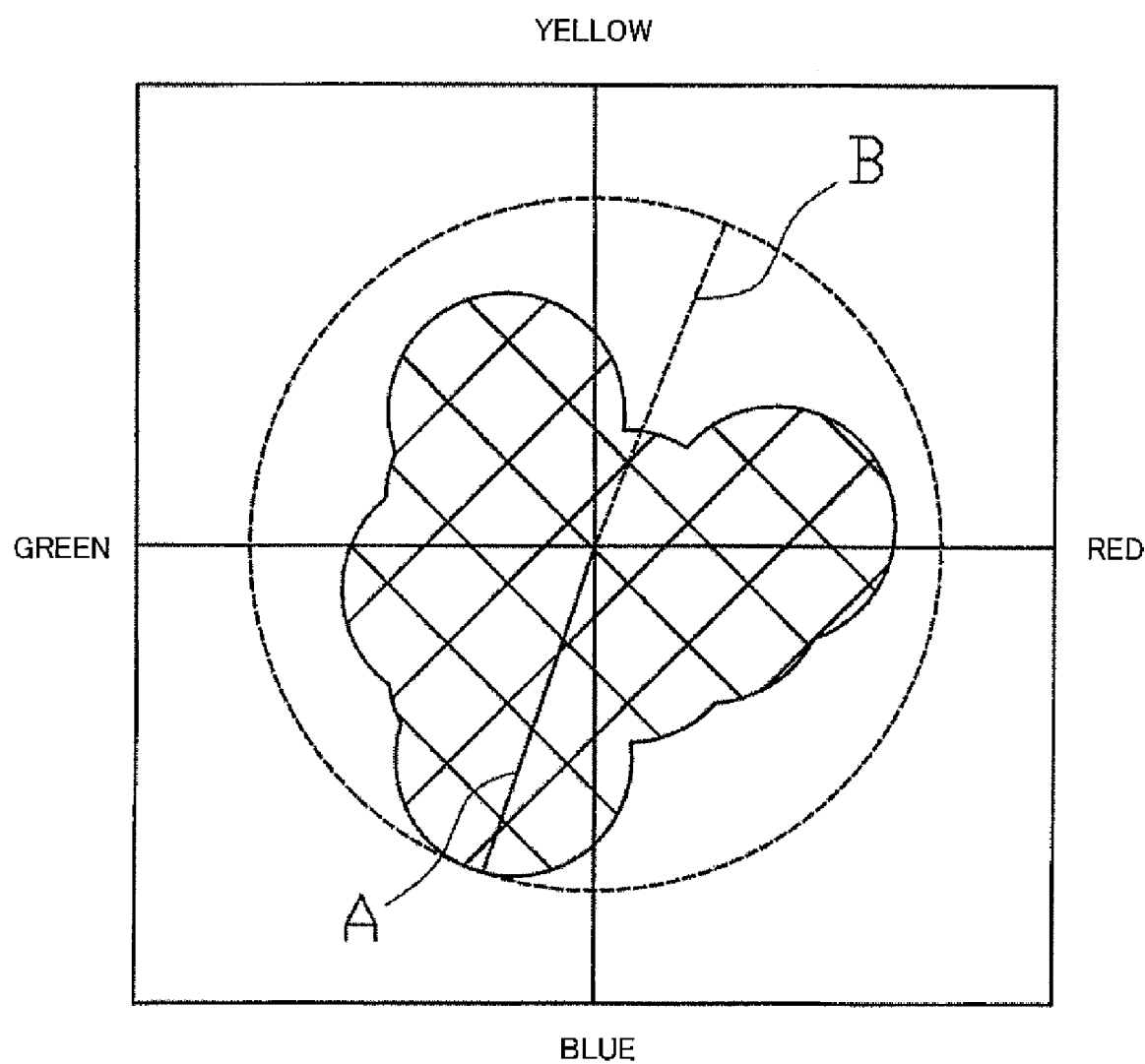
FIG. 5 is a diagram illustrating a specific hue determination method based on chroma saturation.

Image data converted into image data of the hue-chroma saturation system by the coordinate-system conversion unit 108b is provided to specific color determination unit 108c. The specific color determination unit 108c determines the retained hue, i.e., the hue remaining in the color in the printed image based on the inputted image data of the hue-chroma saturation system. Specifically, as illustrated in FIG. 5, pixels of the inputted image data are mapped in a coordinate space of the hue-chroma saturation system, and the hue having the highest chroma saturation is determined as the retained specific hue based on the mapping result. In FIG. 5, a shaded portion indicates the pixels of the mapped image data. A range illustrated by a broken-line circle indicates the highest chroma saturation, and the hue illustrated by a solid line A has the highest chroma saturation. When the retained specific hue (illustrated by the solid line A) is determined, the hue of the complementary color corresponding to the hue illustrated by the solid line A is determined. In FIG. 5, the hue illustrated by broken line B corresponds to the complementary color of the hue illustrated by the solid line A. The hue illustrated by the solid line A is referred to herein as "specific hue" and the hue illustrated by the broken line B is referred to as "complementary color hue". The specific hue A and complementary color hue B determined by the specific color determination unit 108c are provided to a color reduction unit 108d.

Figure 6:
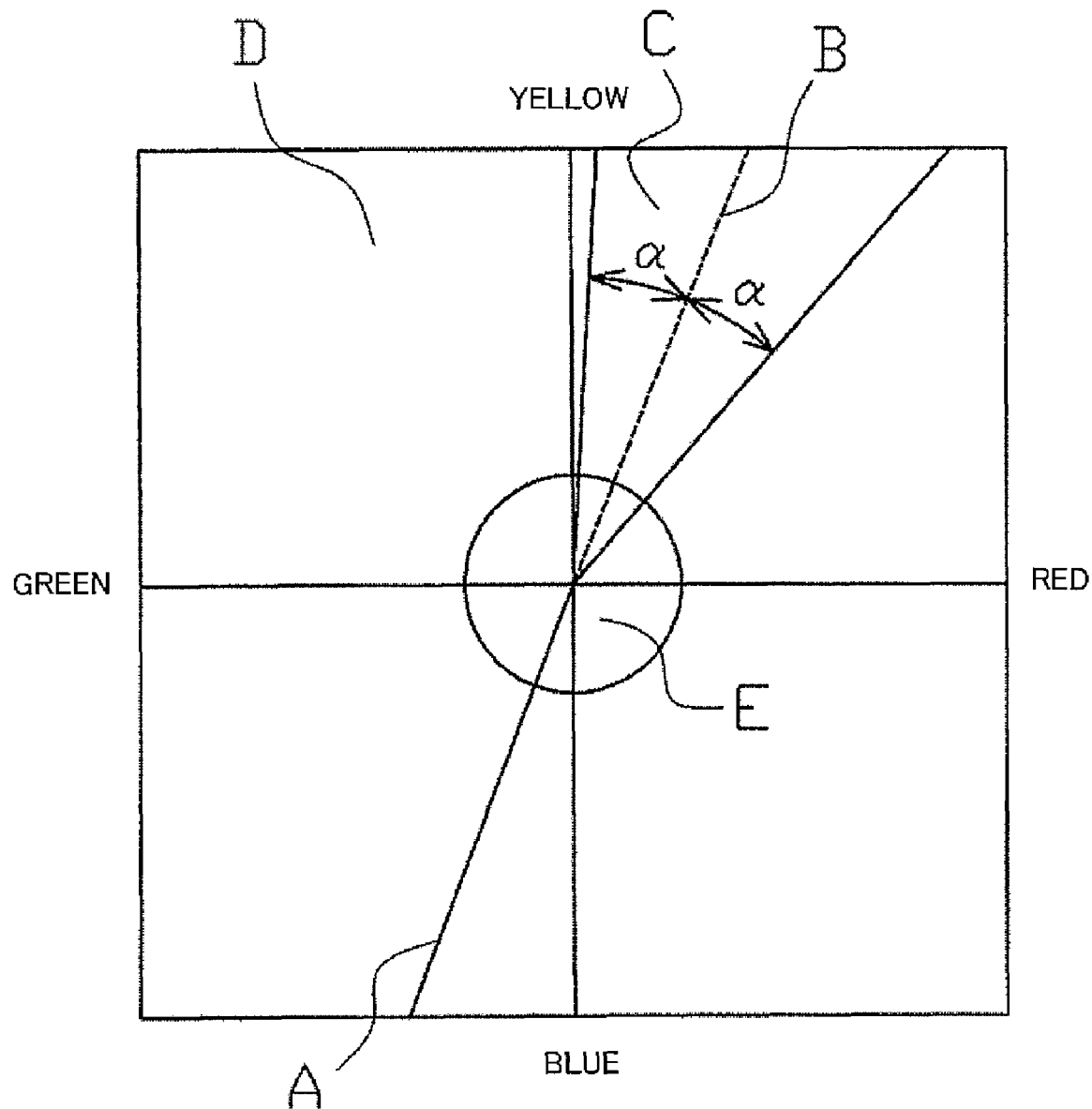
FIG. 6 is a diagram illustrating a color reduction method based on specific hue and complementary color hue.

The color reduction unit 108d performs the color reduction on the image data provided from the coordinate-system conversion unit 108b based on the specific hue A and complementary color hue B provided from the specific color determination unit 108c. Specifically, as illustrated in FIG. 6, all pixels of hues in a range C of angles α on both sides of the complementary color hue B are replaced by the complementary color hue B, and all pixels of hues in a range D outside of the range C are replaced by the specific hue A. For pixels in a range E whose chroma saturation illustrated by the solid-line circle is not more than a predetermined value, the chroma saturation is set to be zero to form a monochrome color.

Figure 7:
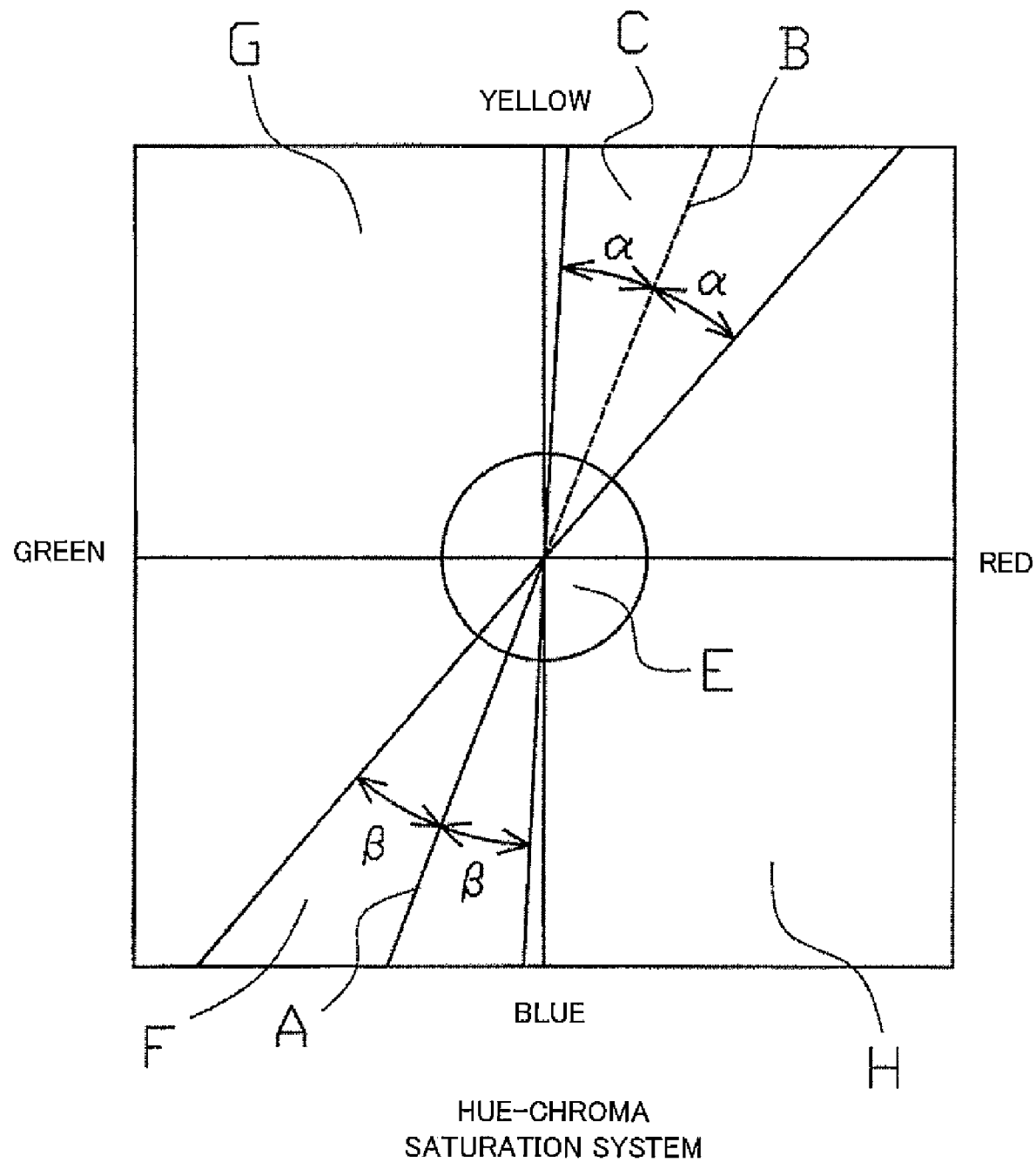
FIG. 7 is a diagram illustrating a color reduction method based on specific hue and complementary color hue.

In addition to the method of FIG. 6, a method illustrated in FIG. 7 can also be adopted as the color reduction method performed by the color reduction unit 108d. Similar to the method of FIG. 6, all pixels of hues in the range C of the angles α on both sides of the complementary color hue B are replaced by the complementary color hue B. Then, all pixels of hues in a range F of angles β on both sides of the specific hue A are replaced by the specific hue A. For pixels in ranges G and H, which are not in ranges C and F, the chroma saturation is set to be zero to form a monochrome color. Similarly to the method of FIG. 6, the chroma saturation is set to be zero for the range E illustrated by the solid-line circle.

Color-reduction image data obtained in this manner is provided to coordinate-system conversion unit 108e. The coordinate-system conversion unit 108e converts the polar coordinate system into the Cartesian coordinate system (polar-system reverse conversion) in order to return the image data to the YCbCr calorimetric system. Conversion of the polar coordinate system into the Cartesian coordinate system is realized by well-known computation processing.

The image data that is color-reduced and converted into the YCbCr calorimetric system is given to a colorimetric-system conversion unit 108f. The colorimetric-system conversion unit 108f converts image data of the YCbCr calorimetric system into image data of the CMYK calorimetric system. This colorimetric-system conversion processing is realized by well-known computation processing. The converted image data of the CMYK calorimetric system is delivered to the printer 111 and printed on a recording medium such as copy paper or an OHP sheet.

Second Embodiment

Figure 8:
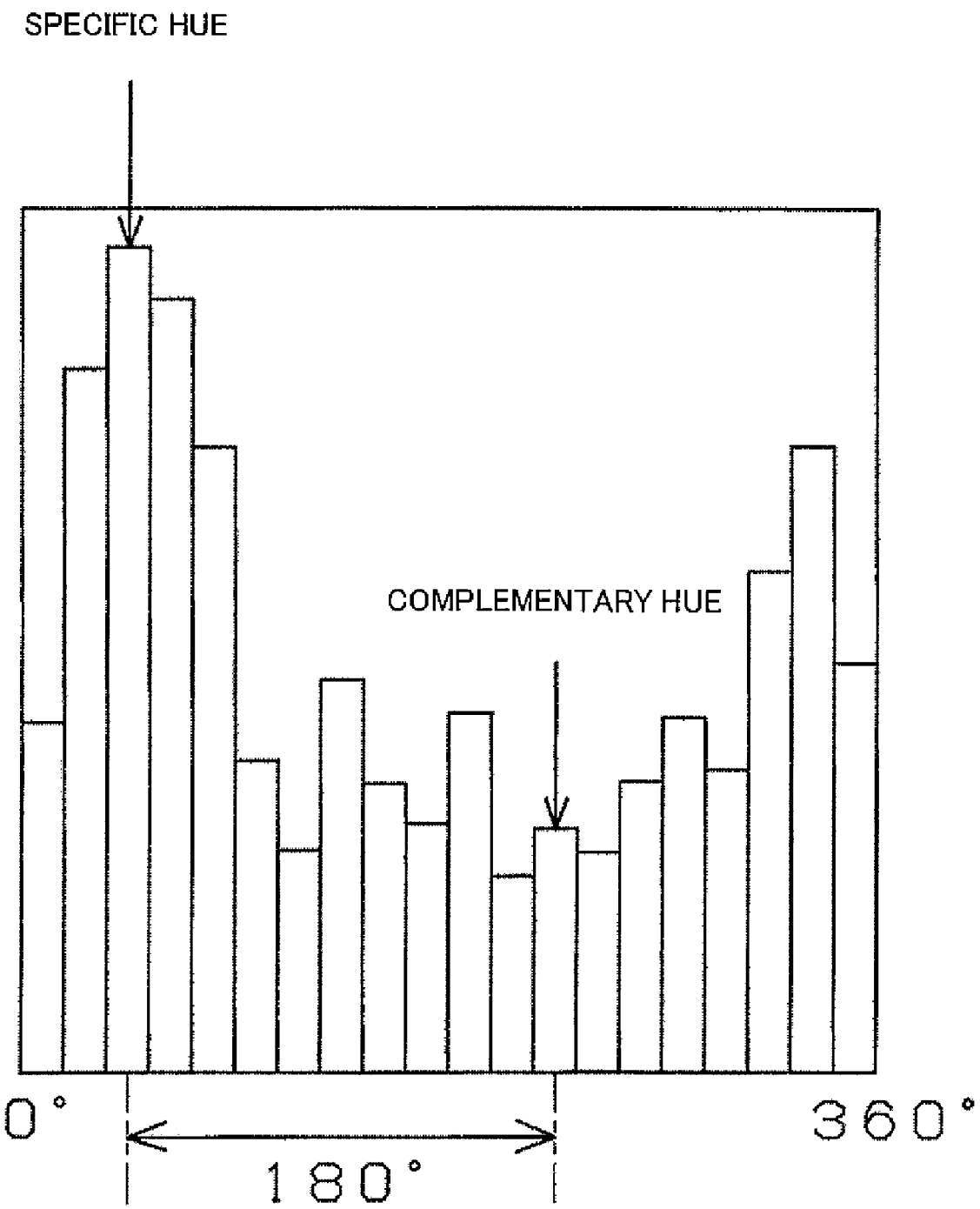
FIG. 8 is a diagram illustrating a specific hue determination method based on a hue appearance frequency.

Color reduction processing according to a second embodiment of the invention differs from the color reduction processing of the first embodiment in the specific hue determination method performed by the specific hue determination unit 108c. While the hue having the highest chroma saturation is set to be the retained specific hue in the first embodiment, the hue having the highest appearance frequency is set to be the specific hue in the second embodiment. That is, as illustrated in FIG. 8, the specific hue determination unit 108c produces a histogram indicating the appearance frequency in each hue (frequency) while setting, for example, the red hue to 0° based on the given image data. In the histogram, the hue having the highest appearance frequency is set to be the specific hue. In this case, the hue separated by 180° from the specific hue becomes the hue becoming the complementary color.

Third Embodiment

Color reduction processing according to a third embodiment of the invention differs from that of the first and second embodiments in the retained specific hue determination method performed by the specific hue determination unit 108c. That is, in the color reduction processing of the third embodiment, the user performs an input operation to the operation unit 105 to determine the specific hue. For example, in a copy mode, when an input for making color-reduction copy in which the retained color is specified is made to the operation unit 105, a screen for specifying the retained (specific) hue is displayed on the LCD of the display unit 106. Selection items of hues such as red, yellow, green, blue, cyan, magenta and yellow are displayed, and the user touches a selection item with the finger to select a specific hue. When the specified color (specific hue) is set to one of cyan (C), magenta (M), and yellow (Y), because the printer 111 has the cyan (C), magenta (M), yellow (Y), and black (K) toners, the toner necessary to print the specific hue is a single color toner and saves the toner used.

As described above, according to the internet facsimile apparatus 1 of the present invention, color reduction is performed by leaving a specific hue determined based on the chroma saturation or appearance frequency and a hue that becomes the complementary color of the specific hue. Accordingly, because the color-reduced image includes the complementary color, high hue contrast is realized irrespective of the color reduction.

Figure 10:
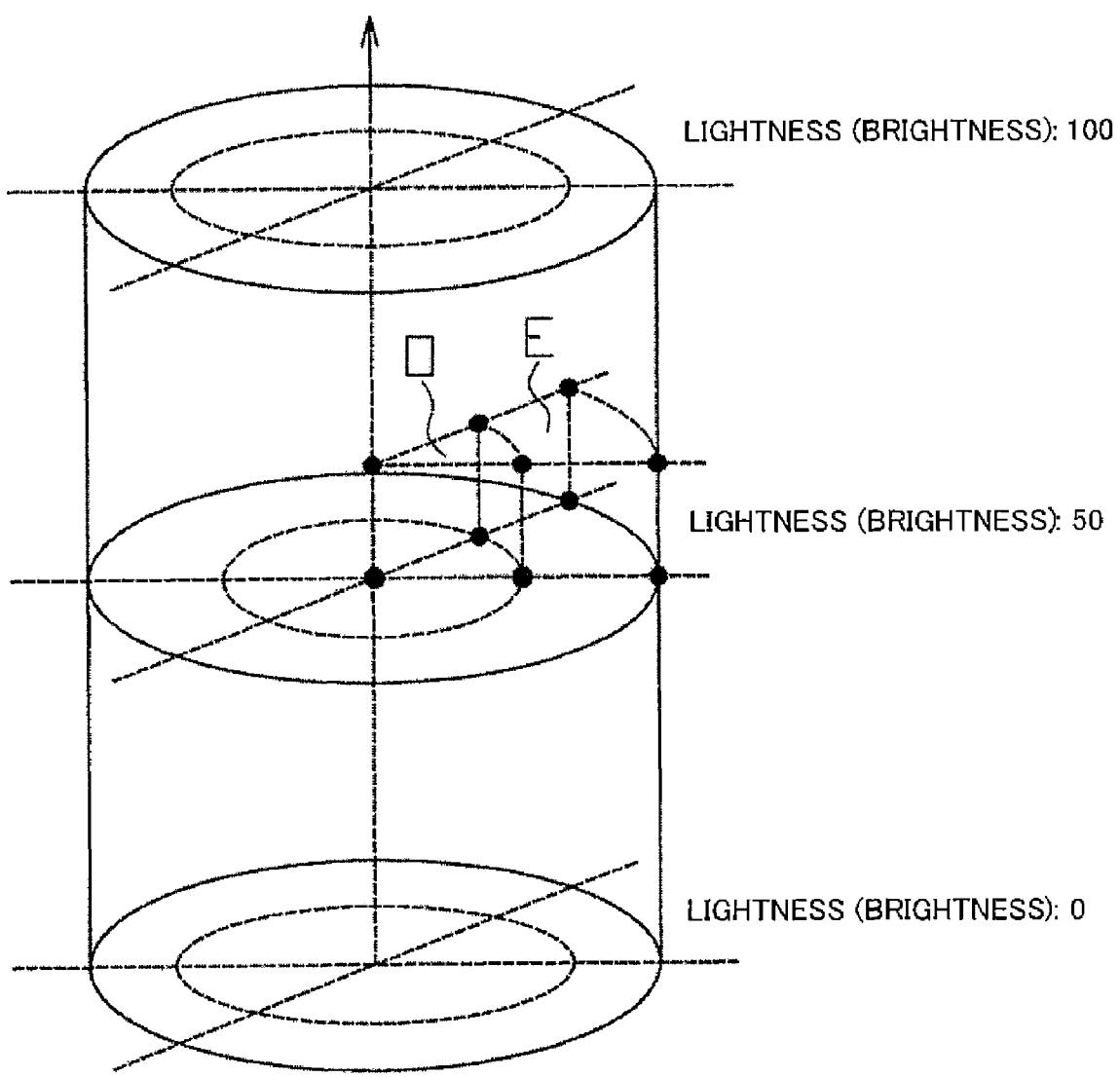
FIG. 10 is a diagram illustrating divided lattice points of the three-dimensional lookup table.

The present invention is not limited to the above-described embodiments, and various changes and modifications can be made without departing from the scope of the invention. In the above-described embodiments, the functions of the color reduction unit 108d, coordinate-system conversion unit 108e, and colorimetric-system conversion unit 108f of the image processing unit 108 are separately processed by individual circuits. Alternatively, as illustrated in FIG. 9, the functions may collectively be processed using a three-dimensional lookup table. In this case, not lattice points obtained by dividing the coordinate space with a cube, but lattice points obtained by dividing the coordinate space with a sectorial rod O and an arc trapezoidal rod E as illustrated in FIG. 10 may be used as the divided lattice points which become the input coordinates of the three-dimensional lookup table. Because the image data of the hue-chroma saturation system which is of the input data is the polar coordinate system, the use of lattice points obtained by dividing the coordinate space with the sectorial rod O and the arc trapezoidal rod E facilitates interpolation computation of a point (pixel) located away from the lattice point.

The coordinate-system conversion unit 108b, the specific hue determination unit 108c, the color reduction unit 108d, and the coordinate-system conversion unit 108e may be realized by a collective table conversion.

In the first embodiment, the specific hue and the complementary color hue may be retained before color reduction of image data when the chroma saturation of the complementary color hue is not lower than a predetermined threshold value, and the specific hue may be retained before color reduction of image data while the complementary color hue is not retained when the chroma saturation of the complementary color hue is lower than the predetermined threshold value.

In the first embodiment, the specific hue and the complementary color hue may be retained before color reduction when a proportion of the chroma saturation of the complementary color hue to the chroma saturation of the specific hue is not lower than a predetermined threshold value, and the specific hue may be retained before color reduction while the complementary color hue is not retained when the proportion of the chroma saturation of the complementary color hue to the chroma saturation of the specific hue is lower than the predetermined threshold value.

In the second embodiment, the specific hue and the complementary color hue may be retained before color reduction of the image data when the appearance frequency of the complementary color hue in the image data is not lower than a predetermined threshold value, and the specific hue may be retained before color reduction of the image data while the complementary color hue is not retained when the appearance frequency of the complementary color hue in the image data is lower than the predetermined threshold value.

In the second embodiment, the specific hue and the complementary color hue may be retained before color reduction of the image data when a proportion of the appearance frequency of the complementary color hue in the image data to the appearance frequency of the specific hue in the same image data is not lower than a predetermined value, and the specific hue may be retained before color reduction of the image data while the complementary color hue is not retained when the proportion of the chroma saturation of the complementary color hue in the image data to the appearance frequency of the specific hue in the same image data is lower than the predetermined value.

In the above-described embodiments, the printer 111 prints the color-reduction image data on recording paper. Alternatively, the color-reduction image data may be encoded in the JPEG method to form a TIFF file including the JPEG image data, followed by outputting the file to a folder of a client PC connected to the internet facsimile apparatus 1 through a LAN.

The present invention can be applied to an image processing apparatus having a function of outputting a document image while reducing the color of the document image.

While the present invention has been described with respect to exemplary embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. An image processing apparatus comprising:
an image generation unit that scans a document to generate image data;
a hue determination unit that determines a specific hue included in the image data and a hue becoming a complementary color of the specific hue;
a color reduction unit that retains the specific hue and the hue becoming the complementary color to reduce a color of the image data; and
an output unit that outputs the image data whose color is reduced by the color reduction unit, wherein
the color reduction unit replaces image data that is of a hue in a predetermined range of angles α on both sides of the complementary color hue with the complementary color hue, and
the color reduction unit replaces image data that is of a hue outside of the predetermined range with the specific hue.

2. An image processing apparatus comprising:
an image generation unit that scans a document to generate image data;
a hue determination unit that determines a specific hue included in the image data and a hue becoming a complementary color of the specific hue;
a color reduction unit that retains the specific hue and the hue becoming the complementary color to reduce a color of the image data; and
an output unit that outputs the image data whose color is reduced by the color reduction unit, wherein
the color reduction unit replaces image data that is of a hue in a predetermined first range of angles β on both sides of the specific hue with the specific hue,
the color reduction unit replaces image data that is of a hue in a predetermined second range of angles α on both sides of the complementary color hue with the complementary color hue, and
chroma saturation of image data that is of a hue outside of the predetermined first and second ranges is set to be zero.

3. An image processing apparatus comprising:
an image generation unit that scans a document to generate image data;
a hue determination unit that determines a specific hue included in the image data and a hue becoming a complementary color of the specific hue;
a color reduction unit that retains the specific hue and the hue becoming the complementary color to reduce a color of the image data; and
an output unit that outputs the image data whose color is reduced by the color reduction unit,
wherein the hue determination unit sets a hue having a highest chroma saturation of hues included in the image data to be the specific hue.

4. The image processing apparatus according to claim 3, wherein
the color reduction unit retains before color reduction of the image data the specific hue and the hue becoming the complementary color when chroma saturation of the hue becoming the complementary color is not lower than a predetermined threshold value, and
the color reduction unit retains before color reduction of the image data the specific hue when the chroma saturation of the hue becoming the complementary color is lower than the predetermined threshold value.

5. The image processing apparatus according to claim 3, wherein
the color reduction unit retains before color reduction of the image data the specific hue and the hue becoming the complementary color when a proportion of chrome saturation of the hue becoming the complementary color to chroma saturation of the specific hue is not lower than a predetermined value, and
the color reduction unit retains before color reduction of the image data the specific hue when the proportion is not lower than the predetermined value.

6. An image processing apparatus comprising:
an image generation unit that scans a document to generate image data;

a hue determination unit that determines a specific hue included in the image data and a hue becoming a complementary color of the specific hue;

a color reduction unit that retains the specific hue and the hue becoming the complementary color to reduce a color of the image data; and an output unit that outputs the image data whose color is reduced by the color reduction unit, wherein the hue determination unit sets a hue having a highest appearance frequency in hues included in the image data to be the specific hue.

7. The image processing apparatus according to claim 6, wherein the color reduction unit retains before color reduction of the image data the specific hue and the hue becoming the complementary color when appearance frequency of the hue becoming the complementary color is not lower than a predetermined threshold value, and the color reduction unit retains before color reduction of the image data the specific hue when the appearance frequency of the hue becoming the complementary color is lower than the predetermined threshold value.

8. The image processing apparatus according to claim 6, wherein the color reduction unit retains before color reduction of the image data the specific hue and the hue becoming the complementary color when a proportion of appearance frequency of the hue becoming the complementary color to appearance frequency of the specific hue is not lower than a predetermined value, and the color reduction unit retains before color reduction of the image data the specific hue when the proportion is lower than the predetermined value.

9. An image processing apparatus comprising:

an image generation unit that scans a document to generate image data;

a hue determination unit that determines a specific hue included in the image data and a hue becoming a complementary color of the specific hue;

a color reduction unit that retains the specific hue and the hue becoming the complementary color to reduce a color of the image data;

an output unit that outputs the image data whose color is reduced by the color reduction unit; and an input accepting unit that accepts an input operation from the outside, wherein the hue determination unit determines the specific hue based on the input operation accepted by the input accepting unit, and the hue determination unit determines the hue becoming the complementary color based on the determined specific hue.

10. An image processing method comprising the steps of:

scanning a document to generate image data;

determining a specific hue included in the image data and a hue becoming a complementary color of the specific hue;

retaining the specific hue and the hue becoming the complementary color to reduce a color of the image data; and outputting the color-reduced image data, wherein image data that is of a hue in a predetermined range of angles α on both sides of the complementary color hue is replaced with the complementary color hue, and image data that is of a hue outside of the predetermined range is replaced with the specific hue.

11. An image processing method comprising the steps of:

scanning a document to generate image data;

determining a specific hue included in the image data and a hue becoming a complementary color of the specific hue;

retaining the specific hue and the hue becoming the complementary color to reduce a color of the image data; and outputting the color-reduced image data, wherein image data that is of a hue in a predetermined first range of angles β on both sides of the specific hue is replaced with the specific hue, image data that is of a hue in a predetermined second range of angles α on both sides of the complementary color hue is replaced with the complementary color hue, and chroma saturation of image data that is of a hue outside of the predetermined first and second ranges is set to be zero.

12. An image processing method comprising the steps of:

scanning a document to generate image data;

determining a specific hue included in the image data and a hue becoming a complementary color of the specific hue;

retaining the specific hue and the hue becoming the complementary color to reduce a color of the image data; and outputting the color-reduced image data, wherein a hue having a highest chroma saturation of hues included in the image data is set to be the specific hue.

13. The image processing method according to claim 12, wherein the specific hue and the hue becoming the complementary color are retained before color reduction of the image data when chroma saturation of the hue becoming the complementary color is not lower than a predetermined threshold value, and the specific hue is retained before color reduction of the image data when the chroma saturation of the hue becoming the complementary color is lower than the predetermined threshold value.

14. The image processing method according to claim 12, wherein the specific hue and the hue becoming the complementary color are retained before color reduction of the image data when a proportion of chroma saturation of the hue becoming the complementary color to chroma saturation of the specific hue is not lower than a predetermined value, and the specific hue is retained before color reduction of the image data when the proportion is not lower than the predetermined value.

15. An image processing method comprising the steps of:

scanning a document to generate image data;

determining a specific hue included in the image data and a hue becoming a complementary color of the specific hue;

retaining the specific hue and the hue becoming the complementary color to reduce a color of the image data; and outputting the color-reduced image data, wherein a hue having a highest appearance frequency in hues included in the image data is set to be the specific hue.

16. The image processing method according to claim 15, wherein the specific hue and the hue becoming the complementary color are retained before color reduction of the image data when appearance frequency of the hue becoming the complementary color is not lower than a predetermined threshold value, and the specific hue is retained before color reduction of the image data when the appearance frequency of the hue becoming the complementary color is lower than the predetermined threshold value.

17. The image processing method according to claim 15, wherein the specific hue and the hue becoming the complementary color are retained before color reduction of the image data when a proportion of appearance frequency of the hue becoming the complementary color to appearance frequency of the specific hue is not lower than a predetermined value, and the specific hue is retained before color reduction of the image data when the proportion is lower than the predetermined value.

18. An image processing method comprising the steps of:

scanning a document to generate image data;

determining a specific hue included in the image data and a hue becoming a complementary color of the specific hue;

retaining the specific hue and the hue becoming the complementary color to reduce a color of the image data;

outputting the color-reduced image data; and accepting an input operation from the outside, wherein the specific hue is determined based on the accepted input operation, and the hue becoming the complementary color is determined based on the determined specific hue.

* * * * *